United States Patent [19]
York

[11] Patent Number: 5,742,426
[45] Date of Patent: Apr. 21, 1998

[54] LASER BEAM TREATMENT PATTERN SMOOTHING DEVICE AND LASER BEAM TREATMENT PATTERN MODULATOR

[76] Inventor: Kenneth K. York, 721 Dolo Way, Los Angeles, Calif. 90077

[21] Appl. No.: 451,016

[22] Filed: May 25, 1995

[51] Int. Cl.$^6$ ............................................. G02B 26/08
[52] U.S. Cl. .................... 359/298; 359/209; 359/211; 606/3; 606/5; 219/121.6; 364/413.01
[58] Field of Search .................... 359/298, 209, 359/210, 211; 606/3, 5, 13, 18; 219/121.6, 121.61, 121.67, 121.69; 364/413.01

[56] References Cited

U.S. PATENT DOCUMENTS

| | | |
|---|---|---|
| 1,883,019 | 10/1932 | Shore . |
| 3,068,740 | 12/1962 | Argyle . |
| 3,377,912 | 4/1968 | Yates . |
| 3,977,760 | 8/1976 | Ullstiq ............................ 350/6 |
| 4,641,038 | 2/1987 | Baker ........................... 359/211 |
| 4,665,913 | 5/1987 | L'Esperance, Jr. ............... 606/3 |
| 4,718,418 | 1/1988 | L'Esperance, Jr. ............... 606/5 |
| 4,724,522 | 2/1988 | Belgorod ........................ 606/5 |
| 4,729,372 | 3/1988 | L'Esperance, Jr. ............... 606/5 |
| 4,732,148 | 3/1988 | L'Esperance, Jr. ............... 606/5 |
| 4,911,711 | 3/1990 | Telfair et al. ................... 606/5 |
| 5,102,409 | 4/1992 | Balgorod ........................ 606/5 |
| 5,108,388 | 4/1992 | Trokel ........................... 606/5 |
| 5,152,759 | 10/1992 | Parel et al. ..................... 606/5 |
| 5,163,934 | 11/1992 | Munnerlyn ..................... 606/5 |
| 5,219,344 | 6/1993 | Yoder, Jr. ....................... 606/5 |
| 5,263,014 | 11/1993 | Kasahara ...................... 369/112 |
| 5,281,211 | 1/1994 | Parel et al. ..................... 606/5 |
| 5,284,477 | 2/1994 | Hanna et al. ................... 606/5 |
| 5,293,265 | 3/1994 | Aleshin et al. ................ 359/198 |
| 5,304,168 | 4/1994 | Sun ............................... 606/4 |
| 5,314,422 | 5/1994 | Nizzola .......................... 606/5 |
| 5,356,409 | 10/1994 | Nizzola .......................... 606/5 |
| 5,376,086 | 12/1994 | Khoobehi et al. ............... 606/4 |
| 5,383,047 | 1/1995 | Guerin ......................... 359/209 |

*Primary Examiner*—Loha Ben
*Attorney, Agent, or Firm*—Patrick F. Bright

[57] ABSTRACT

A laser beam pattern modulator includes a light-transmissive, light-refractive element for rotating and/or linearly displacing the beam such that the refracted beam remains parallel to the incident beam and has the capacity: (a) to minimize a substantial quantity of irregularities in the treatment pattern from hot spots and cold spots in the laser beam; (b) to enlarge and blend the edges of the treatment patterns formed by the beam; and (c) to form an enlarged, multi-zone, aspheric, myopic, hyperopic or astigmatic treatment patterns. A method for treating corneal tissue with laser light, particularly excimer laser light, includes directing a beam of excimer laser light such as a broad beam with variable spot size through a beam modulator such as an anglable, rotatable quartz flat.

6 Claims, 4 Drawing Sheets

VARYING TREATMENT INTENSITY, SAME SPOT SIZE.

VARYING TREATMENT INTENSITY, VARYING SPOT SIZE.

VARYING TREATMENT INTENSITY,
VARYING SPOT SIZE.

VARYING TREATMENT INTENSITY,
SAME SPOT SIZE.

LASER BEAM TREATMENT PATTERN SMOOTHING DEVICE AND LASER BEAM TREATMENT PATTERN MODULATOR

This invention relates to a device for minimizing irregularities in the treatment pattern of the beam from a laser. This invention also relates to a device for modulating and enlarging the light treatment pattern formed by a beam from a laser.

Currently-approved excimer lasers for refractive surgery are limited in that they have beam irregularities (hot and cold spots) that cause irregularities on the corneal surface leading to corneal haze, glare and decreased vision. They also have a small, e.g. 5 millimeter, treatment zone that leads to regression, or loss of effect. This treatment zone is often too small to encompass the entire pupillary aperture leading to visual distortion and glare. Also, they do not correct hyperopia or astigmatism. This invention produces a larger treatment area with a multi-zone pattern, corrects myopia, hyperopia and astigmatism, and moves the beam to average out irregularities, addressing the aforementioned problems.

In preferred embodiments, this device enlarges the treatment pattern of a broad-beam, expanding-spot excimer laser, and blends the edges of the treatment pattern formed by a light beam from a laser, creating a multi-zone or aspheric effect, corrects myopic astigmatism, and simultaneously minimizes irregularities in the treatment pattern from hot spots and cold spots in the laser beam (multipass effect).

In preferred embodiments, these devices are added to or used with an excimer laser to remove or minimize irregularities in the treatment pattern from the laser, and to enlarge the pattern of light formed by such a beam.

This invention also relates to methods for treating corneal eye tissue in a human subject or other targets with laser light comprising directing a beam of light from a laser, for example, an excimer laser, through a variably angled, rotatable, rockable or tiltable, light-transmitting, refracting, laser beam-modulating element, preferably a quartz flat, and then directing the light emerging from the beam modulator onto such corneal eye tissue.

In preferred embodiments, the beam modulator is a quartz flat, preferably substantially flat on each of its two major surfaces, and preferably with anti-reflective coatings on both surfaces, through which laser light can pass. Such an element preferably has a thickness in the range of about 1 millimeter to about 15 millimeters, and a diameter larger than the diameter of the laser beam. The modulator is placed in the path of a laser beam so that the beam passes through the modulator, preferably while the modulator is rotating. By positioning the modulator at a desired angle to the path of incident laser light, preferably at an angle in the range of about 0 degree to about 30 degrees from a line normal to the surface of the modulator, and, optionally, by rotating the modulator, preferably at a rate of about 10 rpm to about 120 rpm, the beam of laser light emerging from the modulator forms a pattern that is larger, has a blended, softer, more gradual edge than the pattern the incident beam without the modulator would create, and has fewer irregularities (valleys or hills) due to hot spots or cold spots in the laser beam than would be created by the incident beam without the modulator.

Rotating the beam modulator, and placing it at a desired angle with respect to the path of the incident laser light, causes the beam emerging from the modulator to move, preferably in a circular pattern for spherical refractive errors. The modulator displaces the beam a variable amount depending on the angle of the beam from a line normal to the (flat) surface of the modulator, on the thickness of the flat, and on the refractive index of the surface, but the displaced beam remains parallel to the original beam. This is unlike the effect of a prism or mirror which changes the angle of the beam as it moves it. The radius of this enlarged pattern depends on the angle of the modulator to the beam that enters the modulator, and upon the refractive index and thickness of the modulator. The rate of movement of the light pattern emerging from the modulator depends upon the rate of rotation of the modulator. Preferably, the displacement of the beam (due to the angle of the flat) at the corneal surface would start at zero millimeter for the smallest spot size of the excimer laser, and increase up to about 1.0 millimeter in each direction for the largest spot size that is used to create the typical concentric expanding treatment pattern for a myopic correction.

Compound myopic astigmatism can be corrected by angling the flat, and rocking it back and forth without rotating it, such that a normally round, expanding spot-treatment pattern becomes elliptical, and a normally spherical power change becomes an astigmatic change. The long axis of the elliptical treatment pattern should be at the flat axis of the cornea to correct corneal astigmatism. Astigmatic corrections can be combined with spherical myopic corrections.

Hyperopia can be corrected by rotating a progressively enlarging or decreasing spot of a broad beam excimer laser such that more pulses strike the periphery of the treatment zone than the center, thus removing more corneal tissue peripherally, and steepening the cornea.

BRIEF DESCRIPTION OF THE DRAWINGS

The invention can better be understood by reference to the drawings, as follows.

DETAILED DESCRIPTION OF THE PREFERRED EMBODIMENTS

Figure 1:
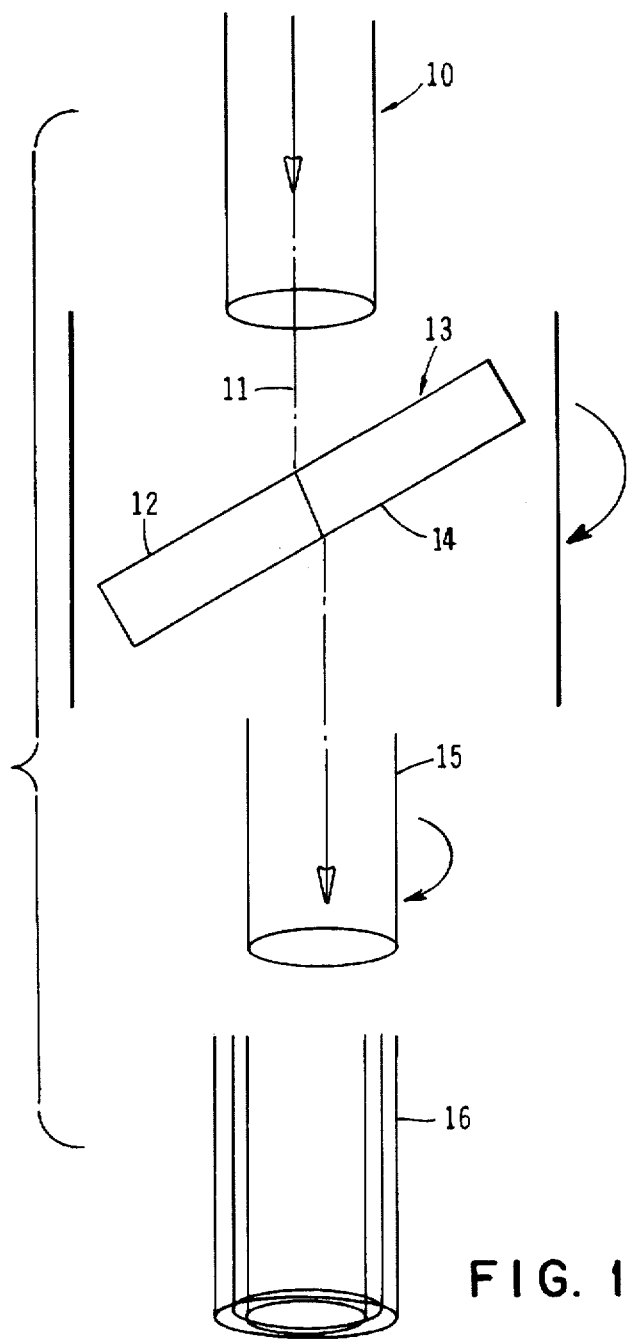
FIG. 1 shows a side view, in schematic, diagrammatical form, the laser beam modulator of this invention in the rotating mode, used with an excimer laser to produce a modulated beam pattern that results from the laser light passing through said modulator.

FIG. 1 (view from side) shows excimer laser beam 10 pointing downwardly. Laser beam 10 follows path 11 and is incident upon first major surface 12 of beam modulator 13 at an angle. Beam modulator 13 is a quartz flat that has two substantially flat major surfaces 12 and 14 on opposing sides of flat 13 at an angle, with respect to beam 10. Laser beam 10 on path 11 passes through quartz flat 13, emerging from surface 14. Modulated laser beam 15 can be seen to be displaced as the arrow in FIG. 1 indicates. Over time, if the angled quartz flat was rotated, as the arrow in FIG. 1 indicates, multiple pulses would be displaced as shown in light pattern 16. Light pattern 16 covers a larger area than unmodulated, unmodified beam 10 would, and creates a treatment pattern that has fewer irregularities than light beam 10 would have created.

Figure 2:
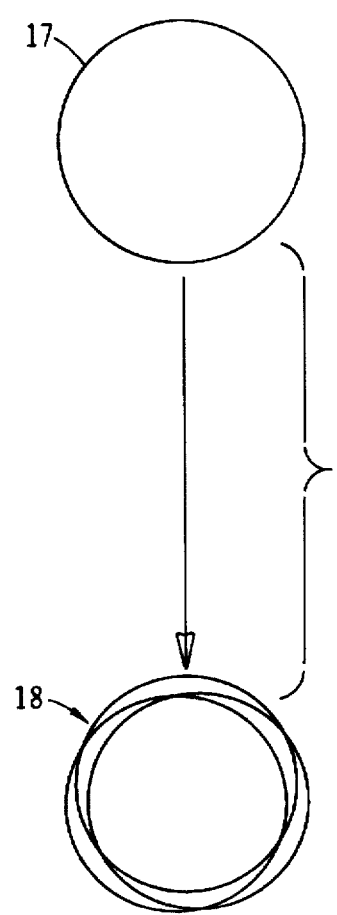
FIG. 2 shows a before (above) and after (below) view of the change in the pattern of laser light treatment produced when such light passes through the modulator of this invention.

FIG. 2 (view from top) shows unmodified laser beam treatment pattern 17, and modified multi-zone laser beam treatment pattern 18 that is formed by beam 15 over time if the angled quartz flat is rotated.

While laser beam path 11 passes through quartz flat 13, quartz flat 13 is rotated along an axis parallel to, and preferably coaxial with the path of travel of light beam 11. The rate of rotation is preferably in the range of about 10 rpm to about 120 rpm.

Figure 3:
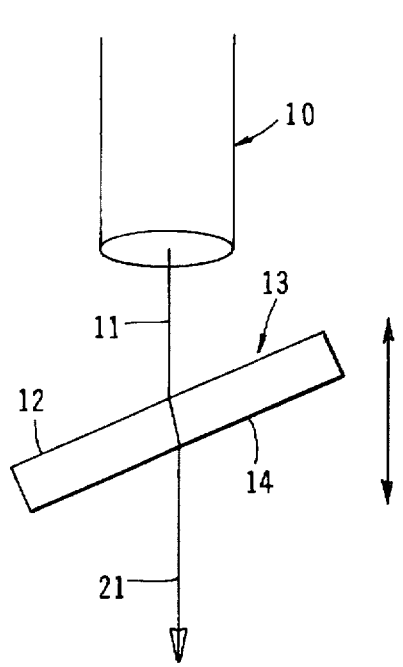
FIGS. 3 and 4 show a side view, in schematic diagrammatical form, of the laser beam modulator of this invention in the rocking, non-rotating mode, used with an excimer laser to produce an elliptical, modulated beam pattern that results from the laser light passing through the modulator.
Figure 4:
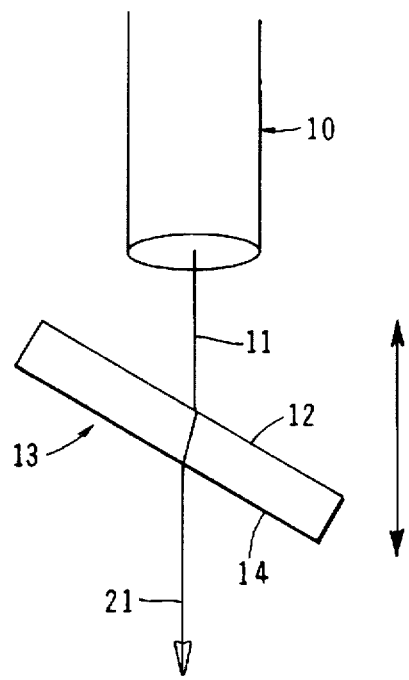

FIGS. 3 and 4 show excimer laser beam 10 pointing downwardly, as in FIG. 1. Laser light beam 10 follows path 11 and is incident upon major surface 12 of beam modulator 13 at an angle. Here, as in FIG. 1, beam modulator 13 is a quartz flat that has two substantially flat major surfaces 12 and 14 on opposing sides of flat 13 at an angle, with respect to beam 10. Laser beam 10 on path 11 passes through quartz flat 13, emerging from surface 14. Here, however, flat 13 is rocked, but not rotated, to produce an elliptical beam pattern.

Figure 5:
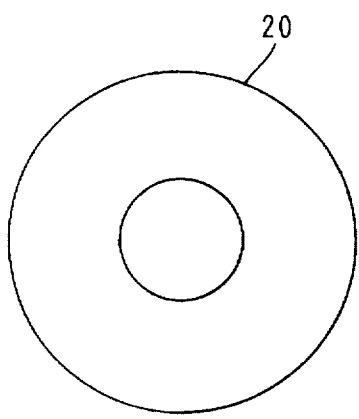
FIG. 5 shows a top view of an unmodulated beam treatment pattern.

FIG. 5 shows the pattern that results when quartz flat 13 is aligned at right angles to laser beam 10 (laser beam is 0° to normal) and is neither rocked nor rotated.

Figure 6:
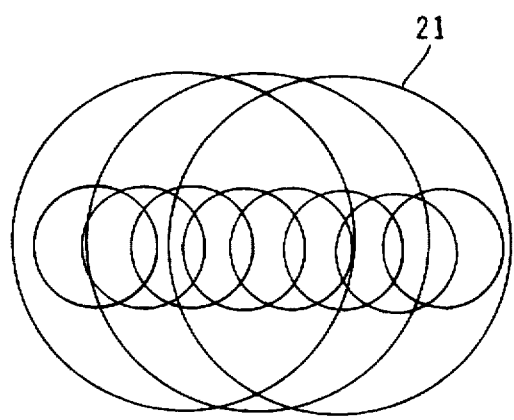
FIG. 6 shows a top view of a modulated beam treatment pattern produced by the modulator in FIGS. 3 and 4 with an elliptical treatment pattern suitable for correcting myopic astigmatism.

FIG. 6 shows, in top plan view, modulated laser beam 21, and the elliptical treatment pattern produced by the rocking, non-rotating motion of flat 13 in FIGS. 3 and 4.

Figure 7B:
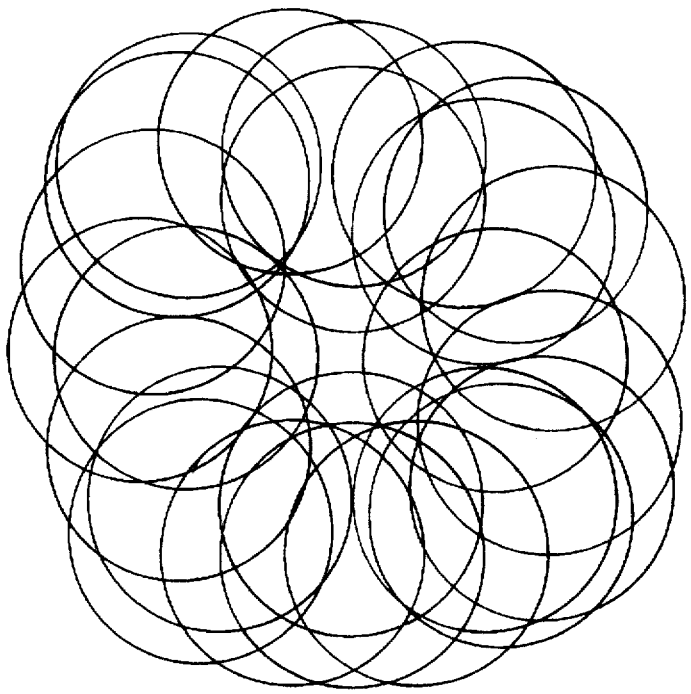
FIGS. 7A and 7B show diagrams of examples of hyperopic treatment patterns created by a rotating beam modulator and a varying or constant spot size.
Figure 7A:
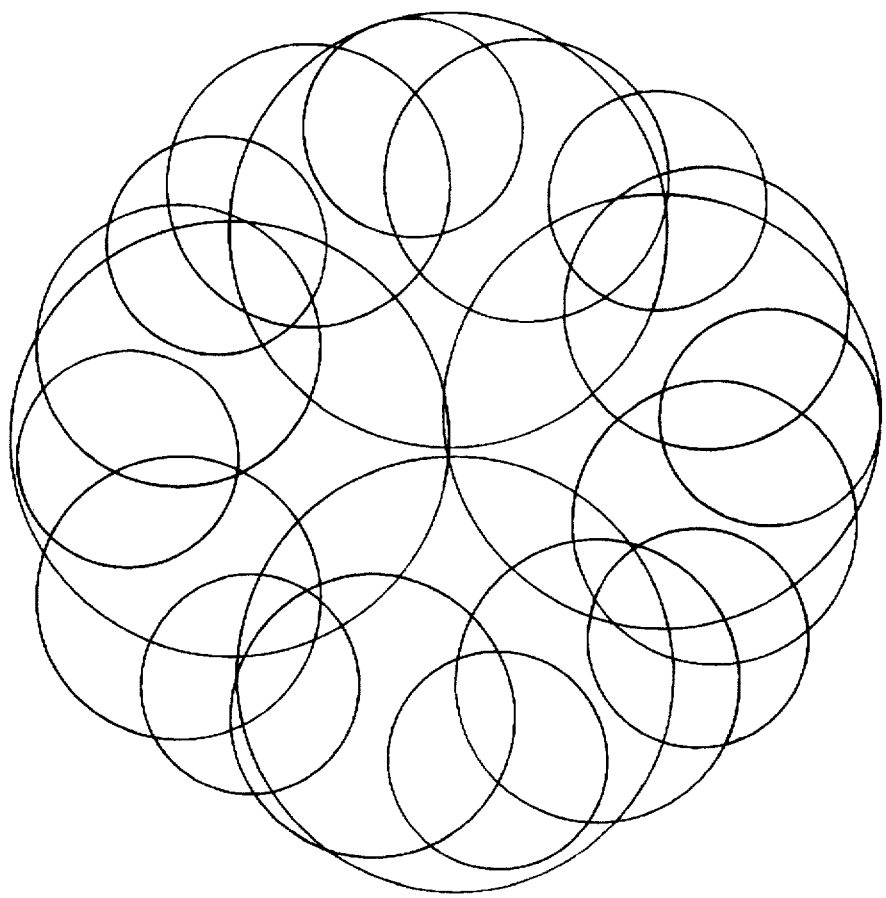

FIGS. 7A and 7B show diagrams of examples of hyperopic treatment patterns created by rotating beam modulator and a varying or constant spot size of light, e.g. when laser beam 10 passes through flat 13.

Figure 8A:
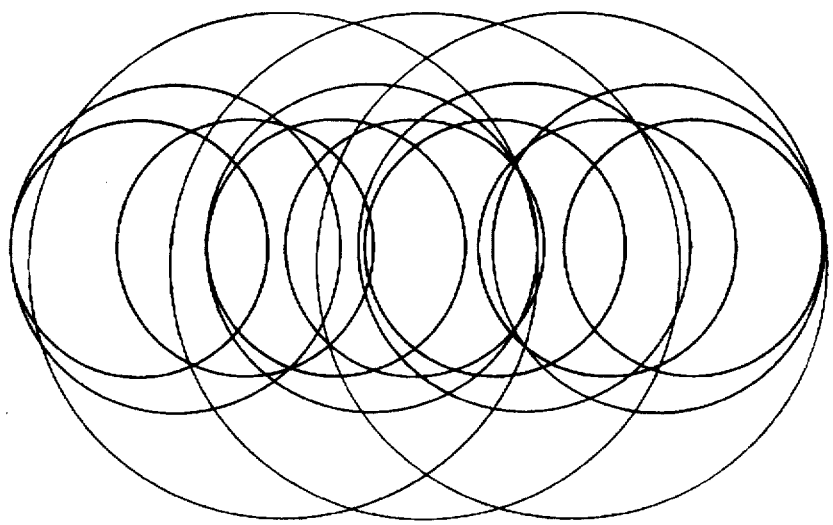
FIGS. 8A and 8B show diagrams of examples of astigmatic treatment patterns created by an angling beam modulator and a varying or constant spot size.
Figure 8B:
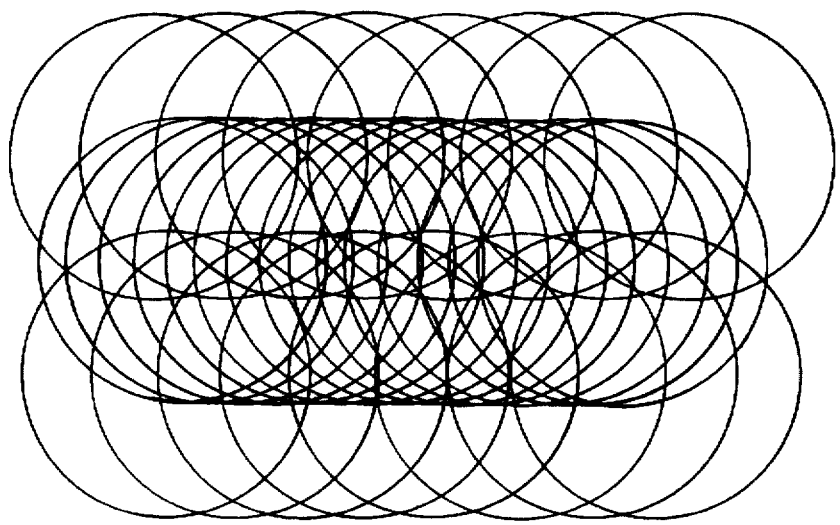

FIGS. 8A and 8B show diagrams of examples of astigmatic treating patterns created by an angling beam modulator and a varying or constant spot size of light, e.g. when laser beam 10 passes through quartz flat 13.

What is claimed is:

1. A light beam modulator for use with a broad-beam excimer laser or with a varying-spot size excimer laser comprising a light-transmissive, light-refractive optical flat having a thickness of at least about 1 millimeter, said optical flat being disposed for rotation in the beam from said broad-beam excimer laser or said varying-spot size excimer laser, or disposed for angular positioning and movement of said flat in the path of said beam, said flat having the capacity to modulate the pattern of light formed after said beam passes through said modulator, and to displace the path of said beam in a desired amount for a desired period of time.

2. A process for modulating the pattern of light formed by the beam from a broad-beam excimer laser or from a varying-spot size excimer laser comprising: (a) directing the light beam from one of said excimer lasers through an optical flat having a thickness of at least about 1 millimeter, and rotating said optical flat, or varying the angle of, and rotating said optical flat in relation to the laser beam path, or angularly positioning or angularly moving said optical flat in the path of said beam, to displace said laser beam a desired amount and to form a modulated light pattern after said beam passes through said optical flat, and (b) directing the modulated beam of laser light onto the corneal tissue of a human subject for a time sufficient to remove corneal tissue in an amount sufficient to correct at least one corneal condition.

3. The method of claim 8 further comprising selecting an optical flat that is sufficiently thick to homogenize and to remove irregularities in the treatment pattern arising from hot spots and cold spots in said beam before said beam passes through said optical flat.

4. The method of claim 2 or claim 3 further comprising varying the tilt of and rotating said optical flat substantially simultaneously during said directing step.

5. The method of claim 2 or claim 3 further comprising angularly positioning, then rotating, said optical flat during said directing step.

6. The method of claim 2 or claim 3 further comprising angularly moving said optical flat during said directing step without rotating during said directing step.

* * * * *